United States Patent [19]

Gridnev

[11] Patent Number: 5,726,263
[45] Date of Patent: Mar. 10, 1998

[54] MOLECULAR WEIGHT TRUNCATION AND COLOR CONTROL IN MACROMONOMERS

[75] Inventor: Alexei Alexeyevich Gridnev, Greenville, Del.

[73] Assignee: E. I. du Pont de Nemours and Company, Wilmington, Del.

[21] Appl. No.: 791,372

[22] Filed: Jan. 30, 1997

[51] Int. Cl.$^6$ ..................................................... C08F 2/38
[52] U.S. Cl. ........................ 526/147; 526/120; 526/131; 526/133; 526/141; 526/319
[58] Field of Search .................................. 526/147, 141, 526/131, 120, 319

[56] References Cited

U.S. PATENT DOCUMENTS 4,680,352  7/1987  Janowicz ................................. 526/147

OTHER PUBLICATIONS

F.W. Billmeyer, Jr., "Textbook of Polymer Science" (1984), 3rd Edition, 116–117, Wiley (New York).

Primary Examiner—Fred Zitomer

[57] ABSTRACT

Macromonomers formed by chain transfer catalysis polymerization methods may be decolorized by selective extraction and/or adsorption. The dimers and trimers formed during the polymerization reaction are also removed from the macromonomer mixture so that the remaining mixture has a very low optical density and a desirable degree of polymerization.

11 Claims, No Drawings

MOLECULAR WEIGHT TRUNCATION AND COLOR CONTROL IN MACROMONOMERS

FIELD OF THE INVENTION

The present invention relates to a process for controlling the molecular weight of macromonomers formed via chain transfer catalysis, as well as the removal of colored compounds formed during the process.

TECHNICAL BACKGROUND

Chain transfer catalysis (CTC) is a method, known to those skilled in the art, for the free radical polymerization of different monomers, including most commonly used methacrylates to form macromonomers, which are commonly used in the formulation of clear coats for coatings, particularly for automotive end-uses.

One issue arising from the use of CTC catalysts is that of the production of low molecular weight and therefore relatively volatile products. An example of this is the production of appreciable quantities of dimers, trimers and tetramers when the polymerization reaction is optimized to give product in which the molecular weight distribution is centered at decamer (i.e., the degree of polymerization, or DP, is 10). Macromonomers whose DP is greater than 10 are generally less desirable due to their relatively higher cost. Dimers and trimers tend to yield less than desirable end products, but their production is unavoidable. In the case of low boiling monomers (e.g., methyl methacrylate) dimer can be removed by distillation, but in other cases (e.g., 2-hydroxyethyl methacrylate, methacrylic acid) the dimer is of a relatively low volatility which precludes its distillation from the polymeric product even under high vacuum. A general method which allows the preparation of relatively low DP distributions which are nonetheless free of the lowest oligomers, and is therefore able to give a desirable DP distribution of 4 to 10, is seen as a critical need, and is addressed in the instant invention.

Another key issue in the use of CTC to form macromonomers is that of color removal from the products. All known CTC catalysts, including cobaloximes (as defined herein) and TAPCo (meso-tetra(4-methoxyphenyl)-porphyrin-Co), and their degradation products are colored and produce colored products (i.e., not water-white), thereby limiting their applicability in critical end-uses. The chain transfer catalyst herein designated COBF represents the family of chemicals defined by Bis-[(1,2-diR*-ethanedioximato)(2-)O:O'-tetrafluorodiborato(2-)-N'N"N"'N""](A)(B)cobalt(III), where R* is alkyl, aryl or substituted aryl, A is an alkyl or substituted alkyl ligand or an acido ligand (e.g., chloro, bromo), and B is a Lewis base (e.g., water, pyridine, imidazole, phosphine, as well as their derivatives). It is preferred that R* is methyl, A is isopropyl and B is water. The COBF used in the examples below was of this preferred composition. The cobaloximes used herein are represented by the family of chemicals defined as Bis[(1,2-diR*ethanedioximato)(A)(B)cobalt (III), where R* A and B are as defined above. Preferred Lewis bases for this family are phosphorous ligands; more preferred are triarylphosphines; most preferred is triphenylphosphine. When A is Cl and B is triphenylphosphine, the chemical is known as cobaloxime CPCO.

In addition to the cobalt(III) compounds described above, cobalt(II) compounds can also be used as catalysts for the invention herein. In the case of the compounds related to COBF and CPCO above, A and B would be absent.

Color removal from polymers is generally a poorly understood process in polymer chemistry. General approaches toward decolorization are known in polymer chemistry but a way to predict which decolorization method would be applicable for the specific polymers involved has not been described previously. Perreault, U.S. Pat. No. 3,440,235 describes the decolorization of perfluorocarbon polymers by a nitric acid treatment. Dickerson, U.S. Pat. No. 4,379,940 outlines a process whereby colored agents are removed from liquid vinyl acetate monomer, but only after several steps including anion exchange resin and activated carbon beds. An approach which describes in sufficient detail a method applicable to a variety of polymers and macromonomers would be a considerable improvement over the current state of the art, and this invention supplies this approach.

Chain transfer catalysis is well known to those skilled in the art. It may be done in either a batch or continuous (CSTR) mode. The method generally involves mixing selected monomers, solvents, an appropriate azo-initiator (e.g., AIBN, VAZO® materials) and a cobalt catalyst (e.g., COBF, CPCO, at a level of 1–1000 ppm), transferring the mixture to a reactor which may be used under vacuum. After three freeze-pump-thaw cycles ($10^{-3}$ Torr vacuum) the reactor is sealed and the contents kept at 40°–80° C. for the amount of time necessary as dictated by the azo-initiator chosen. See generally Janowicz, U.S. Pat. No. 4,680,352.

SUMMARY OF THE INVENTION

The present invention relates to a process of polymerizing a vinylic monomer by chain transfer catalysis, in the presence of a cobalt catalyst, to a mixture of a polymer and a mixture of oligomers and recovering higher oligomers, the improvement of:

(a) determining the polarity of the monomer;
(b) classifying cobalt catalysts as either polar or nonpolar;
(c) carrying out the polymerization of the monomer in the presence of a cobalt catalyst selected so that a polar cobalt catalyst is used with a nonpolar monomer, and a nonpolar catalyst is used with a polar monomer;
(d) if the higher polymer formed in the reaction is insoluble in the polymerization solvent, removing the polymer by filtration prior to removing any colored cobalt compound present in the solution;
(e) if the higher polymer formed in the reaction is soluble in the polymerization solvent or has been removed in step (d) above, separating oligomers from the colored materials and from the higher polymer, if present, by either using a solid sorbent or an extractant.

Additionally, if a sorbent is used, the reaction solution is passed, either as such or diluted with additional solvent, through a bed of sorbent, a polar sorbent being used in the case of polar catalyst and a nonpolar sorbent being used in the case of a nonpolar catalyst, the polarity of the sorbent further being opposite to the polarity of the polymerization solvent determined by the same method as the polarity of the monomer, removing the solvent from the solution, and fractionating the residue to separate higher oligomers from lower oligomers and from any unchanged monomer. And, if an extractant is used, the polymerization solution is extracted with an immiscible liquid having a polarity close to that of the catalyst used and opposite to that of the polymeric material formed, thus removing the colored material, then fractionating the extracted polymerization solution by either distillation or further extraction with at least one solvent in which lower molecular weight polymerization products are more soluble than the higher molecular weight polymerization products, and recovering higher oligomers from the fraction containing them.

DETAILS OF THE INVENTION

The present invention describes a predictable method to remove color, and to separate generally undesirable low DP fractions (e.g., dimers, trimers) and high DP fractions (e.g., DP greater than about 8), from the CTC products by extraction with selected solvents. Generally stated, the method consists of dilution of the reaction mixture from CTC with poor solvents, followed by treatment with a sorbent or other solvent which will form a separate phase from the initial phase. By using this method, substantially all of the monomer and dimer (i.e., about 90% or greater), much of the timer (i.e., about 40–70%), and some of the tetramer (about 30–50%) are removed from the higher polymers.

The chemical structure of the cobalt catalyst used in the CTC is important to the success of the process. The catalyst should be chosen after careful consideration of the properties of both the diluent and the polymer. In the examples below, two different catalysts, COBF and CPCO, have been used to demonstrate this. COBF is applicable when more polar catalysts or catalyst residues are desired. CPCO is applicable when less polar, more lipophilic catalysts or catalyst residues are desired. The polarity of these catalysts is indicated by their solubility in methanol. Relatively polar catalysts, such as COBF and its derivatives, have a room temperature solubility in methanol of greater than about 0.4 g/l. Relatively non-polar catalysts, such as CPCO and its derivatives, have a room temperature solubility in methanol of less than about 0.4 g/l.

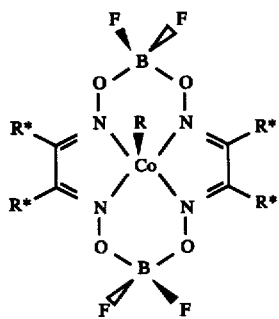

R = isopropyl
COBF
More Polar

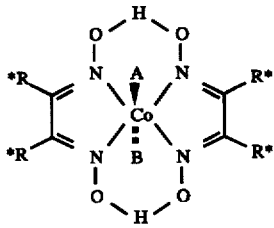

R* = as defined
A = as defined
B = as defined
CPCO
Less Polar

These catalysts can be changed to better suit the systems under study. For example, putting longer hydrocarbon groups on COBF and removing the BF$_2$ groups would convert it to a relatively less polar form. Removing the triphenylphosphine, adding BF$_2$ groups and changing the phenyl(Ph) group to furanyl would make CPCO relatively more polar. The nature of R* is of less importance because it is removed during the course of the catalysis.

This invention demonstrates that dimers and trimers can be conveniently removed from the CTC products by extraction with selected solvents.

The macromonomers currently of interest can be divided roughly into two groups. Each group requires a specific combination of catalyst, diluents, and/or sorbents, and first requires a determination of the relative polarity of the macromonomers involved. Among the ways of determining the relative polarity is by using a solventochromic method as described by J. F. Deye, et at., in Analytical Chemistry, 1990, 62, pp. 615–622, wherein Nile Red (CAS No. 7385-67-3) is used as a solventochromic probe to measure the solvent strength or polarity of various liquids. Nile Red is added to the monomer and the resulting colored solution's optical absorption maximum is measured. Generally, if the maximum absorption is 536 um or greater, the monomer is considered polar; if the maximum is 534 nm or less, the monomer is considered non-polar. The use of other reagents, with the subsequent measurement of polarity which may or may not fall within the same scale of measurement, could also be anticipated.

Large shifts in the wavelength of this absorption maximum can be measured as its transition energy, E, in kcal/mole. Table I summarizes the E values of various monomers as measured by this procedure, which then allows them to be separated into relatively polar and relatively non-polar groups.

TABLE I

| Monomer | E, kcal/mole |
| --- | --- |
| MMA | 54.77 |
| LaurylMA | 54.88 |
| CyclohexylMA | 54.50 |
| Chloroprene | 54.35 |
| Styrene | 53.95 |
| GMA | 53.54 |
| HydroxypropylMA | 52.18 |
| HEMA | 51.89 |

The first group is comprised of relatively non-polar, aliphatic products, and is found in Examples 1–10 below. In general, those monomers with an E value greater than about 53 kcal/mole are considered to be less polar, and BF2-containing cobaloximes (e.g., COBF) are used as the preferred catalyst. For these monomers, relatively low polarity extraction fluids (e.g., ethyl acetate, chloroform, cyclohexane, dichloroethane) could also be used.

This group may generally be described as a polymer of styrene, dienes or methacrylates comprised of monomers of the following structure (I):

$$CH_2=C(CH_3)C(O)OR \qquad (I)$$

where R is alkyl (i.e. C$_1$ and higher alkyls; e.g., methyl, ethyl, octyl, dodecyl, cyclohexyl, cyclohexylmethyl), epoxide (glycidyl), aryl (phenyl or alkylphenyl), substituted alkyl or substituted aryl, where the substituents are relatively non-polar (i.e., benzyl, trimethoxysilylpropyl, dimethoxyethylsilylethyl, chloro- or bromophenyl, chloro- or bromobenzyl), and their copolymers with other comonomers where the comonomer content is less than about 50%. Diluents for this group should be selected from hydrocarbons of the formula CxHy, where x≧5 and y≧10, and the corresponding ethers or their mixtures, and should preferably be relatively low boiling (i.e., boiling point less than about 180° C.) to make evaporation easy (i.e., pentane, hexane, cyclohexane, diethyl ether). Preferred sorbents are silica and alumina.

The second group is comprised of relatively polar products and is found in Examples 11–13 below. Monomers with an E value less than about 53 kcal/mole are considered to be more polar, and non-BF$_2$-containing cobaloximes (e.g., CPCO) are the preferred catalysts, with alumina or silica being the preferred sorbents. This product group may be further described as a polymethacrylate comprised of monomers of the following structure (II):

where R is a substituted alkyl, wherein the substituents are ethers, esters, ketone, alcohols (e.g., hydroxyethyl, ethyltetraethyleneglycol, cyanoethyl, etc.), or substituted aryl (e.g., tolyl, xylyl, naphthyl). The polymethacrylate can also be comprised of copolymers of structure (II) with R-groups as defined, along with other comonomers. The comonomer content should be less than about 50%. Diluents for this group may be ethers, ketones, esters, aromatic hydrocarbons, halogenated solvents, alcohols and water, or their miscible mixtures, and should preferably be relatively low boiling (i.e., boiling point less than about 180° C.) to enable evaporation. In this group, color may be removed by extraction with an immiscible solvent or with an inorganic sorbent.

Once the appropriate CTC catalyst is chosen, a general CTC procedure, as known to those skilled in the art, may be used. This generally involves reacting a CTC catalyst as chosen by the instant invention, and initiator (e.g., VAZO®-52, AIBN, etc.) and monomer(s) in either a batch or continuously stirred (CSTR) mode.

A reaction mixture obtained via the CTC process is diluted with about a 0.2- to about a 3-fold excess of the chosen diluent (as defined below) and passed through a column containing the preferred inorganic sorbent as determined by the above procedure. It is preferred that the material selected and used has a high surface area (e.g., greater than about 30 m$^2$/g). Alternatively, a reaction mixture obtained via the CTC process is diluted with about a 0.2- to about a 3-fold excess of the chosen diluent and extracted with the solvent which is immiscible with the resulting solution. The inorganic sorbent or the second solvent layer absorbs the color. After separation, the decolorized polymer solution is evaporated to remove the added diluent, yielding the decolorized CTC polymer.

The color of the resulting product is measured using a UV spectrometer (Spectrometer 330, Peri-Elmer Corp., Norwalk, Conn.) at 450 nm (generally the wavelength of maximum absorption) in a 1 cm cuvette. The value is reported as the "optical density" (OD), which is empirically obtained by the following equation:

$$OD = 1000 \frac{(\text{optical density})}{(\% \text{ of solids} + \text{monomer})}$$

The higher the OD, the deeper the macromonomer color. A desirable "water-white" macromonomer would have an OD of less than 0.2.

DEFINITIONS

Unless otherwise specified, all chemicals and reagents were used as received from Aldrich Chemical Co., Milwaukee, Wis.

VAZO®-52=2,2'-azobis(2,4-(E. I. du Pont de Nemours and dimethylvaleronitrile) Company, Wilmington, Del.)

VAZO®-88=1,1'-azobis(cyclohexane-(E. I. du Pont de Nemours and 1-carbonitrile Company, Wilmington, Del.)

Neoprene®=polychloroprene synthetic (E. I. du Pont de Nemours and rubber Company, Wilmington, Del.)

AIBN=2,2'-azobisisobutyronitrile

The percent monomer values included in the examples were determined by NMR.

EXAMPLES

Example 1

DECOLORIZATION

A reaction mixture containing 10 mg COBF, 250 mg VAZO-52®, and 40 ml of alumina-treated 3-(trimethoxysilyl)propyl methacrylate was degassed. CTC polymerization was accomplished by holding it 3 hours at 60° C., 1.5 hours at 65° C. and finally 1 hour at 70° C. The yellow (OD=1.8) reaction mixture was then chilled, diluted with 120 ml of hexane and passed through a short alumina column. After the hexane was distilled out, a product containing 16% of unreacted monomer, 55% dimer, 25% trimer and 4% tetramer was collected as a non-viscous, water-white liquid (OD≦0.2).

Example 2

DECOLORIZATION

A reaction mixture containing 50 mg COBF, 2.5 g VAZO-52®, 200 ml cyclohexyl methacrylate and 200 ml 3-(trimethoxysilyl)propyl methacrylate (both were alumina-treated to remove inhibitor) was degassed. It was held 5 hours at 55° C., 32 hours at 60° C., 1 hour at 65° C. and finally 1 hour at 70° C., giving a tan viscous mixture (OD=3.3). The reaction mixture was then chilled, diluted with 1200 ml petroleum ether and passed through a short alumina column. After evaporation at reduced pressure, a product with an average number DP (approx. 8) was collected as a moderately viscous, water-white liquid (OD=0.26).

Example 3

DECOLORIZATION AND DP TRUNCATION

A reaction mixture containing 35 mg COBF, 4 g VAZO-52® and 400 ml MMA (alumina treated to remove inhibitor) was degassed. It was held 2 hours at 60° C., 1 hour at 65° C., 1 hour at 70° C. and finally 1 hour at 75° C. The resulting yellow-brown (OD=6–8) reaction mixture was then chilled, diluted with 800 ml hexane and passed through a short silica column. After evaporation at reduced pressure, a product with a DP≈4 was collected as a moderately viscous, water-white liquid (OD≦0.2). The decolorized product was then separated into two fractions by refluxing with boiling hexane. The high polymer fraction (DP≈18) remained undissolved in the hexane. The moderate MW fraction (DP≈10) was obtained by layer separation after chilling the hexane solution. Most of the low MW fraction (DP≈2.5) remained dissolved in the hexane at ambient temperatures.

These fractions were determined by GPC. Alternatively, the initial product as described above was extracted with water:methanol (1:2) solutions several times to give an undissolved higher MW polymer (DP≈10) fraction and a lower MW fraction. GPC analysis showed that all monomer and dimer, and almost all trimer, were removed from the higher MW fraction.

Example 4

DECOLORIZATION

A reaction mixture containing 1 mg CPCO, 25 mg VAZO-52®, 2 ml chloroform, and 4 ml BMA (alumina treated to remove inhibitor) was degassed. It was held 2 hours at 60° C., 1 hour at 65° C., 1 hour at 70° C., and finally 1 hour at 75° C. The resulting tan reaction mixture (OD=4.6) was then chilled, diluted with 18 ml heptane and passed through a short silica column. After evaporation at reduced pressure, a product with a DP≈12 was collected as a moderately viscous, slightly yellow liquid (OD=0.31).

Example 5

DECOLORIZATION

A reaction mixture containing 1 mg COBF, 25 mg VAZO-52®, 2 ml chloroform and 4 ml glycidyl methacrylate (alumina treated to remove inhibitor) was degassed. It was held 2 hours at 60° C., 1 hour at 65° C., 1 hour at 70° C. and finally 1 hour at 75° C. The brown reaction mixture (OD=8.2) was then chilled, diluted with 18 ml methylene chloride and passed through a short alumina column. After evaporation at reduced pressure, a product with DP≈2.8 was collected as a non-viscous, slightly yellow liquid (OD=0.74). The same degree of decolorization was obtained with diethylether as a diluent instead of methylene chloride.

Example 6

TRUNCATION OF NEOPRENE®

A sample of Neoprene® (87 g, Mn=1650, polydispersity index 4.5; E. I. du Pont de Nemours and Company, Wilmington, Del.) was dissolved in 30 ml of tetrahydrofuran, and poured slowly with stirring into 50 ml of hexane. The mixture separated into two layers. After evaporation, the lower layer gave 64 g of Neoprene® with Mn=3400 and polydispersity index of 3.3. The upper layer gave 14 g of Neoprene® with Mn=726 and a polydispersity index of 2.8.

Example 7

TRUNCATION OF STYRENE/α-METHYLSTYRENE COPOLYMER

A sample of styrene/α-methylstyrene copolymer (28 g, Mn=380, polydispersity index of 2.5) was dissolved in 35 ml of toluene and hexane was poured slowly into 70 ml of well-stirred methanol. The mixture separated into two layers. After evaporation the lower layer gave 7 g of copolymer with Mn=248 and a polydispersity index of 1.23. The upper layer gave 19.5 g of copolymer with Mn=480 and a polydispersity index of 1.91.

Example 8

DECOLORIZATION OF POLYSTYRENE

The reaction mixture obtained after the polymerization of 160 ml of styrene, 40 ml of 1,2-dichloroethane, 2.5 g of AIBN and 0.3 g COBF with an OD=84 was diluted with 120 ml of hexane. The resulting mixture was filtered through a 30×10 mm bed of silica gel to give a product with an OD=0.39.

Example 9

DECOLORIZATION OF NEOPRENE®

The reaction mixture obtained after the polymerization of 30 ml of chloroprene, 60 ml of 1,2-dichloroethane, 0.8 g VAZO®-52 and 0.3 g COBF, which had an OD=80, was evaporated down to 50 ml. Hexane (60 ml) was added and the mixture obtained was filtered through a 30×10 mm bed of silica gel to give a slightly yellow product with an OD=5.

Example 10

DECOLORIZATION OF CHLOROPRENE/METHYLACRYLATE COPOLYMER

The reaction mixture obtained after polymerization of 50 ml of MA, 14 ml of chloroprene, 50 ml of 1,2-dichloroethane, 20 g of VAZO®-88 and 0.05 g COBF, which had an OD=25, was diluted with 150 ml of heptane. The mixture obtained was filtered through a 30×10 mm bed of silica gel to give a slightly yellow product with an OD=1.5.

Example 11

DECOLORIZATION

A reaction mixture containing 3 mg CPCO, 50 mg VAZO-52®, 3 ml ethyl acetate, 2 ml isopropanol and 5 ml 2-hydroxyethyl methacrylate (HEMA) (alumina treated to remove inhibitor) was degassed. It was held 3 hours at 60° C., 1 hour at 65° C., 30 min at 70° C. and finally 1 hour at 75° C. The brown reaction mixture (OD=9.8) was then chilled, diluted with 30 ml of water:methanol (2:3) mixture and passed through a short column of charcoal. After evaporation at reduced pressure, a product with a DP≈2.2 was collected as a moderately viscous, transparent liquid (OD<0.2). Decolorization by adding methanol only, instead of the water:methanol mixture, gave a transparent, viscous liquid (OD≦0.2).

Example 12

DECOLORIZATION AND DP TRUNCATION

A reaction mixture containing 25 mg CPCO, 75 mg AIBN, 5 ml methylene chloride and 10 ml of HEMA (alumina treated to remove inhibitor) was degassed. It was held 4 hours at 75° C., 1 hour at 80° C., and finally 1 hour at 85° C. The dark brown reaction mixture (OD=10.3) was then allowed to cool and taken into solution by extraction three times with equal volumes of water:methanol (1:2) solution. The solution was extracted with 0.05 to 0.4 volume of a chlorinated, non-miscible solvent (e.g., 1,2-dichloroethane) to remove traces of color in the water-methanol layer. Then the water-methanol layer was evaporated to give polymeric product as a transparent liquid (OD≦0.2).

The decolorized product as described above was separated into DP fractions by extraction with esters. For example, ethyl acetate extraction of the above polymer solution removed all dimer and trimer and unreacted monomer. Tetramer was only partially extracted. The composition of the ethyl acetate layer was found to be dimer:trimer:tetramer:higher oligomers=40:16:5:1.5 by NMR. The composition of the water layer was substantially depleted of dimer, trimer and tetramer.

Example 13

DECOLORIZATION AND DP TRUNCATION

A reaction mixture containing 25 mg CPCO, 75 mg VAZO 52®, 4 ml acetone, 4 ml of methanol, 2 ml isopropanol, 3.6 ml methacrylic acid and 0.4 ml ethyltetraethyleneglycol methacrylate was degassed. It was held 18 hours at 55° C., 3 hours at 60° C., 1 hour at 65° C., and finally 4 hours at 70° C. The reaction mixture was then chilled, and extracted three times with a three-fold excess of chloroform. High polymer precipitated, while low MW product, unreacted monomers and catalyst residues stayed in solution. After evaporation, high oligomers were obtained as white solids giving colorless solutions upon dissolution in water.

I claim:

1. In a process for polymerizing an acrylic monomer by chain transfer catalysis, in the presence of a cobalt catalyst, to a mixture of polymers and oligomers of the acrylic monomer, in the presence of a polymerization solvent, and recovering higher polymers and oligomers, the improvement of:
  (a) determining the polarity of the monomer;
  (b) classifying cobalt catalysts as either polar or nonpolar;
  (c) carrying out the polymerization of the monomer in the presence of a cobalt catalyst selected so that a polar cobalt catalyst is used with a nonpolar monomer, and a nonpolar catalyst is used with a polar monomer;
  (d) if the higher polymers or oligomers formed in the reaction is insoluble in the polymerization solvent, removing the polymer by filtration prior to removing any colored cobalt compound present in the solution;
  (e) if the higher polymers or oligomers formed in the reaction is soluble in the polymerization solvent or has been removed in step (d) above, separating oligomers from any colored materials and from the higher polymer, if present.

2. The process as recited in claim 1,
wherein said polarity of the monomer is determined by classifying the monomer as polar or nonpolar;
and wherein said cobalt catalysts are classified as either polar or nonpolar on the basis of their solubility in methanol.

3. The process as recited in claim 1 wherein in step (e) a solid sorbent is used to separate the oligomers from the colored materials and the higher polymer, if present; and comprising the additional steps of:
  (a) passing the reaction solution, either as such or diluted with additional solvent, through a bed of sorbent, a polar sorbent being used in the case of polar catalyst and a nonpolar sorbent being used in the case of a nonpolar catalyst, the polarity of the sorbent further being opposite to the polarity of the polymerization solvent;
  (b) removing the solvent from the solution; and
  (c) fractionating the residue to separate higher oligomers from lower oligomers and from any unchanged monomer.

4. The process as recited in claim 1(e), wherein an extractant is used to separate the oligomers from the colored materials and the higher polymer, if present; and comprising the additional steps of:
  (a) extracting the polymerization solution with an immiscible liquid having a polarity close to that of the catalyst used and opposite to that of the polymeric material formed, thus removing the colored material;
  (b) fractionating the extracted polymerization solution by either distillation or further extraction with at least one solvent in which lower molecular weight polymerization products are more soluble than the higher molecular weight polymerization products; and
  (c) recovering higher and lower molecular weight fractions from the fractions containing them.

5. The process as recited in claim 3, wherein substantially all of the monomer and dimer, much of the trimer, and some of the tetramer, are removed from the higher polymers.

6. The process as recited in claim 4, wherein substantially all of the monomer and dimer, much of the trimer, and some of the tetramer, are removed from the higher polymers.

7. The process as recited in claim 3, wherein said higher polymers and oligomers are comprised of methacrylate homopolymers.

8. The process as recited in claim 4, wherein said higher polymers and oligomers are comprised of methacrylate copolymers.

9. The process of claim 1 wherein the monomer is nonpolar and the catalyst is COBF.

10. The process of claim 1 wherein the monomer is polar and the catalyst is CPCO.

11. The process of claim 1 wherein the catalyst is cobalt II.

* * * * *